3,227,734
HERBICIDAL 4-METHYLSULFONYL-2,6-DINITRO-N,N-SUBSTITUTED ANILINES
Samuel B. Soloway, Sittingbourne, England, and Kenneth D. Zwahlen, Modesto, Calif., assignors to Shell Oil Company, New York, N.Y., a corporation of Delaware
No Drawing. Filed Nov. 13, 1964, Ser. No. 411,120
3 Claims. (Cl. 260—397.6)

This invention relates to novel compounds useful in destroying and/or preventing growth of unwanted plants. In particular, this invention relates to novel 4-(methylsulfonyl)-2,6-dinitro-N,N-substituted anilines found to be very active herbicides.

The compounds of the invention are represented by the generic formula:

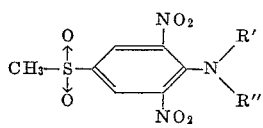

wherein R' and R" each is the same and is hydrocarbon of 3 carbon atoms free from acetylenic unsaturation. Because of their outstanding herbicide properties 4-(methylsulfonyl) - 2,6 - dinitro - N,N - dipropylaniline and 4-(methylsulfonyl)-2,6-dinitro-N,N-diallylaniline are preferred.

The following examples are presented to show how the compounds of the invention can be prepared and to illustrate their effectiveness as herbicides.

In the following examples, the parts given are by weight.

EXAMPLE I.—PREPARATION OF 4-(METHYLSULFONYL)-2,6-DINITRO-N,N-DIPROPYLANILINE

A. *Preparation of 4-chloro-3,5-dinitrophenyl methyl sulfone*

6 parts of 4-chloro-3-nitrophenyl methylsulfone was added portionwise to a mixture of 49 parts of fuming $H_2SO_4$ (30%) and 16 parts of red fuming $HNO_3$ (d. 1.60) at 30° C. The reaction was heated with stirring to 120–140° C. for 3 hours, then poured over ice. The separated solid was filtered, water-washed, and dried. The product was recrystallized from dimethyl formamide solution by adding alcohol to give 4.5 parts of pale yellow crystals, M.P. 201–203° C. Structure confirmed by elemental analysis—viz. (percent by weight).

|  | Cl | N |
|---|---|---|
| Calculated for $N_2SO_6ClC_7H_5$ | 13.7 | 10.0 |
| Found | 12.9 | 10.0 |

B. *Preparation of 4-(methylsulfonyl)-2,6-dinitro-N,N-dipropylaniline*

15 parts of 4-chloro-3,5-dinitrophenyl methylsulfone was suspended in 120 parts of methanol and 15 parts of dipropylamine were added. The reaction mixture was heated for two hours, chilled, and the separated solid filtered. The product was washed and recrystallized to give 18 parts of golden crystals, M.P. 150–151° C. (91% yield). Structure confirmed by elemental analysis—viz. (percent by weight).

|  | N | S |
|---|---|---|
| Calculated for $N_3SO_6C_{13}H_{19}$ | 12.2 | 9.3 |
| Found | 12.0 | 9.3 |

EXAMPLE II.—PREPARATION OF 4-(METHYLSULFONYL)-2,6-DINITRO-N,N-DIALLYLANILINE 14 parts of 4-chloro-3,5-dinitrophenyl methyl sulfone was suspended in 120 parts of methanol in a reaction flask equipped with a mechanical stirrer. 10 parts of diallyl amine was added to the mixture dropwise. The reaction mixture was heated to reflux for 1½ hours, cooled in an acetone-dry ice bath, and solid which formed was filtered. The solid was recrystalized from methanol to give 12 parts of yellow crystals, m.p. 108–111° C. (71% yield). Structure confirmed by elemental analysis—viz. (percent by weight).

|  | N | S |
|---|---|---|
| Calculated for $N_3SO_6C_{13}H_{15}$ | 12.3 | 9.4 |
| Found | 11.0 | 9.1 |

EXAMPLE III

The pre-emergence herbicide activity of the compound of the invention was evaluated by planting weed seeds in soil treated with the candidate herbicides at the rate of 10 pounds per acre. Seeds of watergrass (*Echinochloa crusgalli*) and cress (*Lepidium sativum*) were germinated in treated soil under controlled conditions of temperature and light for 10–11 days prior to evaluation of the effectiveness of the treatments. At this time, the germination was noted and the treatments were rated on a 0 (no effect) to 9 (all dead) scale. The results are summarized in Table I.

TABLE I.—PRE-EMERGENCE SOIL HERBICIDE TESTS

| Test Compound | 10 lbs./A. Watergrass | 10 lbs./A. Cress |
|---|---|---|
| 4-(methylsulfonyl)-2,6-dinitro-N,N-dipropylaniline | 8 | 7 |
| 4-(methylsulfonyl)-2,6-dinitro-N,N-diallylaniline | 8 | 8 |

EXAMPLE IV

The post-emergence herbicide activity of the compounds of the invention was evaluated by spraying dilute suspensions of the compounds in a 1:1 mixture of acetone and water with 0.5% wetting agent on crabgrass (*Digitaria sanguinalis*) and pigweed plants (*Amaranthus sp.*) grown under controlled conditions. After the plants were held for 10–11 days, they were rated for treatment effect on a 0 (no effect) to 9 (total plant kill) scale. The results are set forth in Table II.

TABLE II.—POST-EMERGENCE SPRAY HERBICIDE TESTS

| Test Compound | Weed control rating | |
|---|---|---|
|  | 10 lbs./A. Crabgrass | 10 lbs./A. Pigweed |
| 4-(methylsulfonyl)-2,6-dinitro-N,N-dipropylaniline | 8 | 6 |
| 4-(methylsulfonyl)-2,6-dinitro-N,N-diallylaniline | 8 | 7 |

EXAMPLE V.—FIELD TESTS

The pre-emergent and post-emergent activity of 4-(methylsulfonyl)-2,6-dinitro-N,N-dipropylaniline has been evaluated in field tests. When a logarithmic series of dosages of this compound was sprayed onto bare soil, it was found that 95% control of rye grass was obtained at 0.8 pound per acre while less than 0.2 pound per acre controlled crabgrass. This nitroaniline is therefore a highly effective pre-emergent herbicide.

Watergrass and pigweed plants were sprayed with 4-(methylsulfonyl)-2,6-dinitro-N,N-dipropylaniline in the field at a series of logarithmic dosages and it was found that 95% control of watergrass was obtained at the dosage of 0.3 pound per acre while 1.6 pounds per acre controlled 95% of the pigweed. 4-(methylsulfonyl)-2,6-dinitro-N,N-dipropylaniline is also a very promising post-emergent herbicide.

In a similar pre-emergent tests, 4-(methylsulfonyl)-2,6-dinitro-N,N-diallylaniline controlled 95% of ryegrass at 2.7 pounds per acre, cheatgrass at 6.1 pounds per acre, dock and pigweed at less than 1 pound per acre.

One advantage of the nitroaniline herbicides of this invention is that they are not very volatile, and tend to remain in that part of the soil into which they are introduced; some may be moved through the soil by water. Consequently, by appropriate selection of the part of the soil into which they are introduced, relative to the seeds of wanted plants and those of unwanted plants, and taking into account the effect of water, these herbicides can be used to prevent all plant growth, even at relatively low dosages in some cases, or their selectivity can be improved to prevent growth of unwanted plants without harm to wanted plants. For example, as is well known, only those weed seeds which are present within about one-quarter inch of the surface of the soil will germinate, whereas the seeds of cereal, and other, crops, for example, ordinarily are sown about one-half to three-quarters of an inch below the surface of the soil, and germinate well under these conditions. By introducing the herbicide only into the top one-quarter inch of the soil, and avoiding excessive watering, germination of the weeds seeds can be prevented, while germination of the crop seeds will not be effected. Thus, even those herbicides of this invention that are not very selective in their action can be used to selectively remove weeds from cereal grains or other crops. Of course, if complete kill of all plants in a given portion of soil is desired, it is necessary only to introduce one or more of the nitroanilines herbicides throughout that portion of soil.

The nitroanilines are soluble in the common organic horticultural solvents. Thus, according to the intended method of application, the character of the plants involved, and the concentration of herbicide to be used, the herbicidal nitroanilines can be formulated as a solution or suspension in water, or a suitable nonphytotoxic organic solvent, as a dispersion or emulsion of the active agent in a non-solvent therefor, as an emulsion of a solution of the active agent in a suitable solvent emulsified with a second, inhomogeneous liquid, or as a solid comprising the active agent or agents sorbed on a sorptive solid carrier.

When a light hydrocarbon oil is to be used as carrier, suitable materials for the purpose include any of the spray oils marketed commercially for this purpose. The highly aromatic hydrocarbons are preferred. Thus, highly refined aromatic hydrocarbons, such as benzene, toluene, xylene, ethylbenzene, cumene or isodurene, may be used, or the carrier may be a less highly refined relatively aromatic hydrocarbon mixture, such as a coal tar fraction, a straight-run petroleum distillate, a thermally or catalytically cracked hydrocarbon oil, platformate, or the like. Suitable solvents may also comprise a relatively aliphatic hydrocarbon material, or mixtures of aromatic and aliphatic hydrocarbons. Suitable aliphatic hydrocarbon materials include refined gas oil, light lubricating oil fractions, refined kerosene, mineral seal oil and the like. Spray oils boiling in the range of from 275° F. to 575° F. are suitable, as are spray oils boiling in the range of from 575° F. to 1000° F. and having an unsulfonatable residue of at least 75%. Mixtures of such spray oils also may be used.

Although the solvent usually will be of mineral origin, animal or vegetable oils as well as synthetic solvents also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier.

Solutions of the active agents may be applied as such to the plants or to the soil that is to be treated, or they may be suspended in water and the suspension or emulsion applied to the plants or soil. Thus, a relatively concentrated solution of the active agent in a water-immiscible solvent may be prepared, with added emulsifying, dispersing or other surface-active agents, and the concentrate diluted in the spray tank with water to form a uniform fine emulsion which can be applied by conventional spray devices. Emulsions or dispersions of the active agents as such in water may also be prepared and applied.

Suitable emulsifiable concentrates, adapted for dispersion in water to provide a sprayable composition, ordinarily will contain between about 5% by weight and about 50% by weight of active agent dissolved in a hydrocarbon or other suitable water-immiscible solvent. Minor amounts, for example, about 0.5% by weight to about 10% by weight, of emulsifying agents may be included to promote dispersion of the concentrate in water. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation-active wetting and emulsifying agents may be used for this purpose, the non-ionic agents are preferred since the concentrates in which they are present have increased stability and do not suffer phase separation when diluted with hard water. Suitable non-ionic agents which may be used are available commercially as, for example, Triton X–100 and Lissapol N—believed to be condensation products of alkylphenols with ethylene oxide—and Tweens—believed to be condensation products of ethylene oxide and higher fatty acid esters, for example, oleic acid ester of anhydrosorbitols.

Liquid compositions of these herbicidal nitroanilines suitable for application to plants or to their environment contain the active agent or agents in concentrations generally within the range of from about 0.01% by weight to about 50% by weight.

The invention includes novel solid compositions of matter wherein the active agent or agents are adsorbed or absorbed in or on a sorptive carrier, such as finely divided clay, talc, gypsum, lime, wood flour, fuller's earth, kieselguhr, or the like. The solid composition, or dust, may contain from as little as 1% by weight of active material to 75% by weight of active material, or even more. It may be prepared as a dust, or as granules designed to be broadcast or to be worked into the soil. Compositions formulated as wettable powders are particularly suitable. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.1 to 30 or more pounds per acre. It will be appreciated that the rate of application is subject to variation according to the particular active agent used, the particular species of plants involved, and the local conditions, for example, temperature, humidity, moisture content of the soil, nature of the soil, and the like. Effective resolution of these factors is well within the skill of those well versed in the herbicide art.

The herbicidal compositions may contain one or more of the herbicidal nitroanilines set out hereinbefore as the sole active agent, or they may contain in addition thereto other biologically active substances. Thus, insecticides, e.g., DDT, endrin, dieldrin, aldrin, chlordane, demeton, methoxychlor, DDVP, naled Ciordin® Insecticide and Bidrin® Insecticide, rotenone and pyrethrum, and fungicides, such as copper compounds, ferbam, captan, and the like, may be incorporated in the compositions. Further, if desired, the herbicidal compositions may contain fertilizers, trace metals, or the like and when applied directly to the soil may additionally contain nematocides, soil conditioners other plant regulators, such as naphthalene acetic acid, 2,4-dichlorophenoxyacetic acid and the like, and/or herbicides of different properties.

We claim as our invention:
1. A compound of the formula:

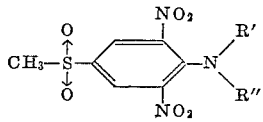

wherein R' and R" each is the same and is a hydrocarbon of 3 carbon atoms free from acetylenic unsaturation.

2. 4 - (methylsulfonyl) - 2,6 - dinitro-N,N-dipropylaniline.

3. 4-(methylsulfonyl) - 2,6 - dinitro - N,N - diallylaniline.

References Cited by the Examiner
UNITED STATES PATENTS

| | | | |
|---|---|---|---|
| 2,053,818 | 9/1936 | Felix et al. | 260—397.6 |
| 2,938,042 | 5/1960 | Stevenson et al. | 260—397.6 |
| 3,111,403 | 11/1963 | Soper | 71—2.3 |

FOREIGN PATENTS 917,253  1/1963  Great Britain.

OTHER REFERENCES

Llosa et al.: Bull Soc., Chim. France, 1960, pages 1621 to 1625.

Lavishchev et al.: Zhur. Obshch. Khim. 32, pp. 502–506 (1962).

WALTER A. MODANCE, *Primary Examiner.*